(12) United States Patent
Renaudier et al.

(10) Patent No.: US 9,166,682 B2
(45) Date of Patent: Oct. 20, 2015

(54) CARRIER PHASE ESTIMATOR FOR NON-LINEAR IMPAIRMENT MONITORING AND MITIGATION IN COHERENT OPTICAL SYSTEMS

(75) Inventors: Jeremie Renaudier, Nozay (FR); Adrian Voicila, Nozay (FR); Sébastien Bigo, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 415 days.

(21) Appl. No.: 13/513,950

(22) PCT Filed: Nov. 19, 2010

(86) PCT No.: PCT/EP2010/067799
§ 371 (c)(1),
(2), (4) Date: Jun. 26, 2012

(87) PCT Pub. No.: WO2011/072980
PCT Pub. Date: Jun. 23, 2011

(65) Prior Publication Data
US 2012/0269507 A1     Oct. 25, 2012

(30) Foreign Application Priority Data
Dec. 18, 2009   (EP) .................................... 09290976

(51) Int. Cl.
*H04B 10/06* (2006.01)
*H04B 10/079* (2013.01)

(52) U.S. Cl.
CPC ................................ *H04B 10/0795* (2013.01)

(58) Field of Classification Search
CPC .... H04B 10/61; H04B 10/6165; H04B 10/60; H04B 10/611; H04B 10/612; H04B 10/0795; H04B 10/541; H04B 10/5561; H04B 10/613; H04B 10/616; H04L 27/3836; H04L 2027/0026; H04L 25/0202

USPC .......... 398/202–205, 208, 210, 211, 209, 25, 398/34, 35, 140, 185, 186, 188
See application file for complete search history.

(56) References Cited

U.S. PATENT DOCUMENTS 5,299,231 A * 3/1994 Guglielmi et al. ............ 375/344
6,128,494 A * 10/2000 Rozmaryn .................... 455/436
(Continued)

FOREIGN PATENT DOCUMENTS

EP      1511033      3/2005
EP      1755296      2/2007

OTHER PUBLICATIONS

A. Bononi et al; Cross-Phase Modulation Induced by OOK Channels on Higher-Rate DQPSK and Coherent QPSK Channels; Journal of Lightwave Technology, IEEE Service Center; New York, NY; USA; Vol PP, No. 18; Sep. 5, 2009; pp. 3974-3983; XP011268532; ISSN: 0733-8724.

(Continued)

*Primary Examiner* — Hibret Woldekidan
(74) *Attorney, Agent, or Firm* — Patti & Malvone Law Group, LLC

(57) ABSTRACT

The present document relates to a method and apparatus in optical transmission systems for the estimation of the carrier phase and the degree of non-linear distortions incurred in an optical transmission channel. A plurality of signal samples are provided at succeeding time instances such that the plurality of signal samples: is associated with a modulation scheme and a carrier phase; has been transmitted over the optical transmission channel; comprises a plurality of signal phases, respectively; comprises a plurality of data phases and a plurality of residual phases, respectively; and the plurality of residual phases is associated with the carrier phase. The method comprises further canceling the plurality of data phases from the plurality of signal phases by taking into account the modulation scheme; thereby yielding the plurality of residual phases; and determining a set of autocorrelation values of the plurality of residual phases for a set of lag values, respectively.

14 Claims, 4 Drawing Sheets

(56) References Cited

U.S. PATENT DOCUMENTS

| | | | |
|---|---|---|---|
| 6,314,115 B1* | 11/2001 | Delfyett et al. | 372/6 |
| 6,600,794 B1 | 7/2003 | Agarossi et al. | |
| 7,894,728 B1* | 2/2011 | Sun et al. | 398/208 |
| 8,295,713 B2* | 10/2012 | Cai | 398/208 |
| 8,340,530 B2* | 12/2012 | Cai | 398/163 |
| 8,452,193 B2* | 5/2013 | Onaka | 398/212 |
| 8,538,279 B2* | 9/2013 | Li et al. | 398/208 |
| 8,588,624 B2* | 11/2013 | Zhang et al. | 398/208 |
| 9,036,992 B2* | 5/2015 | Djordjevic et al. | 398/25 |
| 2002/0060827 A1 | 5/2002 | Agazzi | |
| 2003/0058499 A1* | 3/2003 | Reingand et al. | 359/135 |
| 2007/0286268 A1* | 12/2007 | Kim et al. | 375/226 |
| 2009/0190926 A1* | 7/2009 | Charlet et al. | 398/74 |
| 2010/0183054 A1* | 7/2010 | Daly et al. | 375/219 |
| 2011/0129230 A1* | 6/2011 | Zanoni et al. | 398/140 |
| 2012/0087679 A1* | 4/2012 | Goldfarb | 398/208 |

OTHER PUBLICATIONS

A.J. Lowery et al; Performance of Optical OFDM in Ultralong-Haul WDM Lightwave Systems; Journal of Lightwave Technology, IEEE Service Center; New York, NY; USA; LNKD-DOI:10.1109/JLT.2006.888161; vol. 25, No. 1; Jan. 1, 2007; pp. 131-138; XP011175480; ISSN: 0733-8724.

H.P. Sardesai et al; A Femtosecond Code-Division Multiple-Access Communication System Test Bed; Journal of Lightwave Technology, IEEE Service Center; New York, NY; USA; vol. 16, No. 11; Nov. 1, 1998; XP011029265; ISSN: 0733-8724.

* cited by examiner

CARRIER PHASE ESTIMATOR FOR NON-LINEAR IMPAIRMENT MONITORING AND MITIGATION IN COHERENT OPTICAL SYSTEMS

TECHNICAL FIELD

The present document relates to optical transmission systems. In particular, the present document relates to a method and apparatus for the estimation of the carrier phase and for the estimation of the degree of non-linear distortions incurred in an optical transmission channel.

BACKGROUND

The use of coherent optical receivers becomes a requirement for next generation optical transponders providing high spectral density 100 Gb/s (and beyond) channels over optical WDM (wavelength division multiplexing) networks based on 50 GHz-spacing grids. Indeed, coherent detection provides a good tolerance to linear fiber effects such as chromatic dispersion and polarization mode dispersion. However, another major concern of WDM optical transmission systems is the resilience to non-linear impairments that directly impact the achievable reach and/or the achievable transmission capacity. Such non-linear fiber effects are e.g. self-phase modulation (SPM) and/or cross-phase modulation (XPM).

U.S. Pat. No. 6,600,794B1 describes a MLSE receiver for laser light reflected from an optical disk. Bononi A et al., "Cross-Phase Modulation Induced by OOK Channels on Higher-Rate DQPSK and Coherent QPSK Channels", Journal of Lightwave Technology, IEEE Service Center, NY, US, vol. PP, no. 18, May 9, 2009, pages 3974-3983, describes a method for estimating the performance of high datarate QPSK channels impaired by XPM.

The non-linear fiber effects distort the amplitude and the phase of the transmitted optical signal and an important element for the compensation of these distortions is the reliable and correct determination of the carrier phase of the optical signal as a phase reference. Consequently, a coherent optical receiver should comprise a carrier phase estimator for the recovery of the carrier phase before decision of the transmitted symbols. As such, an automatic optimization scheme of the carrier phase estimator depending on the non-linear effects incurred by the received optical signal in the optical transmission channel would be beneficial, in order to obtain good estimates of the carrier phase and to thereby mitigate the incurred non-linear impairments and to thereby improve the performance of the optical transmission system. Furthermore, it would be beneficial to provide a measure of the degree of non-linear effects present in an optical transmission channel.

SUMMARY

According to an aspect a method for measuring the non-linearity of an optical transmission channel of an optical fiber is described. The method may comprise the step of providing, at a receiver, a plurality of signal samples at succeeding time instances. The plurality of signal samples may be associated with a modulation scheme, which allows a number of possible data phase values, and a carrier phase. In particular, the plurality of signal samples may be associated with a plurality of transmitted signal samples at a corresponding transmitter. The transmitted signal samples may be encoded using a modulation scheme, e.g. M-PSK. Subsequently, the transmitted signal samples may be modulated onto an optical carrier signal having the optical carrier phase. Eventually, the transmitted signal samples may be transmitted over the optical transmission channel where the transmitted signal samples may incur various linear and/or non-linear distortions. The non-linear distortions may be due to SPM and/or XPM.

The plurality of signal samples, i.e. the received signal samples, may comprise a plurality of signal phases, respectively. In particular, a signal sample may comprise an in-phase and a quadrature phase component which may be represented in polar coordinates as a signal amplitude and as a signal phase. The plurality of signal phases may comprise a plurality of data phases and a plurality of residual phases, respectively, wherein the data phases are associated with the encoded data. The plurality of residual phases may be associated with the carrier phase. In addition, the residual phases may be associated with various noise components, e.g. ASE (amplified spontaneous emission) noise, laser noise (due to phase noise of the transmitting laser and/or a local oscillator laser) and/or non-linear noise (e.g. due to non-linear effects in the optical transmission channel).

The method may comprise the step of canceling the plurality of data phases from the plurality of signal phases by taking into account the modulation scheme; thereby yielding the plurality of residual phases. In case the modulation scheme corresponds to M-PSK (phase shift keying), this canceling step may comprise raising the plurality of signal phases to the power of M. In case the modulation scheme corresponds to x-QAM (quadrature amplitude modulation), this canceling step may comprise raising the plurality of signal phases to a power corresponding to the number of possible data phase values associated with the x-QAM modulation scheme.

The method may comprise the step of determining a set of autocorrelation values of the plurality of residual phases for a set of lag values, respectively; thereby yielding a measure for the non-linearity of the optical transmission channel. The set of lag values may comprise various offsets of time instances or time slots. By way of example, the set of lag values may comprise offsets of a certain number of time slots or time instances.

As already mentioned above, the plurality of residual phases may comprise a plurality of non-linear induced phase noise values and a plurality of laser phase noise values, respectively. In such cases, the method may comprise the step of determining an autocorrelation value of the plurality of residual phases for a first lag value; thereby yielding an autocorrelation value of the laser phase noise. Typically, the first lag value is selected to be a relatively large lag value. By way of example, the first lag value may be selected to be the maximum and/or minimum value from the set of lag values. The method may further comprise the step of determining a set of autocorrelation values of the non-linear induced phase noise by subtracting the autocorrelation value of the laser phase noise from the set of autocorrelation values of the plurality of residual phases.

The method may comprise the step of determining an autocorrelation value of the non-linear induced phase noise at a lag value of zero, by interpolating a plurality of autocorrelation values of the set of autocorrelation values of the non-linear induced phase noise for lag values different from zero.

The method may comprise the step of determining a second lag value for which a value of the set of autocorrelation values of the non-linear induced phase noise is at half of a maximum value of the set of autocorrelation values of the non-linear induced phase noise; wherein the second lag value is a measure for the non-linearity of the optical transmission channel. As such, the second lag value, which may also be referred to as the correlation length, may be used by a network control layer of an optical transmission network for the allocation of transmission channels. Furthermore, the second lag value may be used in the context of a carrier phase estimator, as will be outlined below.

Typically, the first lag value should be greater than the second lag value. In an embodiment, the first lag value is significantly greater than the second lag value. Preferably, the first lag value should be sufficiently greater than the second lag value, in order to ensure that the autocorrelation values of the non-linear induced phase noise are negligible at the first lag value. As such, it may be stated that the first lag value should be selected such that it is greater or significantly greater than the to-be-determined second lag value. In a similar manner, the limits of the set of lag values should be selected such that their absolute values are greater or significantly greater than the to-be-determined second lag value.

The step of determining a set of autocorrelation values of the plurality of phase values for a given lag value may comprise the step of multiplying a phase value of the plurality of phase values at a first time instance by a phase value of the plurality of phase values at a second time instance; wherein the lag value corresponds to a difference between the second time instance and the first time instance, i.e. to the offset between the second and the first time instance.

The method may comprise the step of determining an autocorrelation value of the plurality of residual phases for a lag value of zero; and the step of normalizing the set of autocorrelation values of the plurality of residual phases for the set of lag values by the autocorrelation value of the plurality of residual phases for the lag value of zero.

According to a further aspect, a method for determining a plurality of estimates of a carrier phase of a signal transmitted over an optical transmission channel of an optical fiber is described. The method may comprise the step of receiving, at a receiver, a plurality of samples of the signal at succeeding time instances. The plurality of signal samples may be associated with a modulation scheme, which allows a number of possible data phase values, and the carrier phase. At a corresponding transmitter, the plurality of signal samples has been encoded using the modulation scheme, modulated onto an optical carrier signal having the carrier phase and transmitted over the optical transmission channel. Furthermore, the plurality of signal samples may comprise a plurality of signal amplitudes and signal phases, respectively. The plurality of signal phases may comprise a plurality of data phases and a plurality of residual phases, respectively. The plurality of residual phases may be associated with the carrier phase.

The method may comprise the step of canceling the plurality of data phases from the plurality of signal phases by taking into account the modulation scheme; thereby yielding the plurality of residual phases. Furthermore, the method may comprise the step of determining a second lag value or a correlation length according to any of the methods and method aspects outlined in the present document.

The method may comprise the step of filtering the plurality of residual phases with a filter comprising a number of filter taps corresponding to two times the second lag value; thereby yielding a plurality of filtered residual phases, associated with the plurality of estimates of the carrier phase at the succeeding time instances. The weights of the filter taps may be equal, e.g. 0 or 1, depending in the second lag value. In particular, a number of filter tap weights corresponding to two times the second lag value may be set of 1, whereas the other filter tap weights are set to 0.

A filtered residual phase value of a first time instance may be determined from residual phase values from the plurality of residual phases at time instances before and after the first time instance. In particular, the filtered residual phase value of the first time instance may be determined from a number of residual phases at time instances before and after the first time instance, wherein the number corresponds to the second lag value. In other words, the filter taps may be centered around the first time instance.

The method may comprise the steps of dividing the plurality of filtered residual phases by a factor associated with the modulation scheme. In case of M-PSK modulation, the factor may be M. Furthermore, the method may comprise the step of unwrapping the plurality of divided filtered residual phases; thereby yielding the plurality of estimates of the carrier phase at the succeeding time instances.

According to another aspect, a system configured to provide a measure of the non-linearity of an optical transmission channel of an optical fiber is described. The system may comprise a reception unit configured to provide a plurality of signal samples at succeeding time instances; wherein the plurality of signal samples is associated with a modulation scheme, which allows a number of possible data values, and a carrier phase; wherein, at a corresponding transmitter, the plurality of signal samples has been encoded using the modulation scheme, modulated onto an optical carrier signal having the carrier phase and transmitted over the optical transmission channel; wherein the plurality of signal samples comprises a plurality of signal amplitudes and signal phases, respectively; wherein the plurality of signal phases comprises a plurality of data phases and a plurality of residual phases, respectively; wherein the plurality of residual phases is associated with the carrier phase. The system may further comprise a data phase cancellation unit configured to cancel the plurality of data phases from the plurality of signal phases by taking into account the modulation scheme; thereby yielding the plurality of residual phases; and a carrier phase statistics determination unit configured to determine a set of autocorrelation values of the plurality of residual phases for a set of lag values, respectively; thereby yielding the measure for the non-linearity of the optical transmission channel.

According to a further aspect, a carrier phase estimation unit configured to provide a plurality of estimates of a carrier phase at succeeding time instances is described. The unit may comprise a reception unit configured to provide a plurality of signal samples at the succeeding time instances; wherein the plurality of signal samples is associated with a modulation scheme, which allows a number of possible data phase values, and the carrier phase; wherein the plurality of signal samples has been encoded using the modulation scheme, modulated onto an optical carrier signal having the carrier phase and transmitted over an optical transmission channel; wherein the plurality of signal samples comprises a plurality of signal amplitudes and signal phases, respectively; wherein the plurality of signal phases comprises a plurality of data phases and a plurality of residual phases, respectively; wherein the plurality of residual phases is associated with the carrier phase. The carrier phase estimation unit may further comprise a data phase cancellation unit configured to cancel the plurality of data phases from the plurality of signal phases by taking into account the modulation scheme; thereby yielding the plurality of residual phases; a carrier phase statistics determination unit configured to determine a second lag value or a correlation length according to any of the methods and method aspects described in the present document; and a filtering unit configured to filter the plurality of residual phases with a filter comprising a number of filter taps corresponding to two times the second lag value; thereby yielding a plurality of filtered residual phases, associated with the plurality of estimates of the carrier phase at the succeeding time instances.

According to another aspect, an optical receiver is described. The receiver may comprise a coherent receiver configured to receive an in-phase and a quadrature component of an optical signal; and/or an optical detection unit configured to convert the optical signal into an electrical signal; and/or a plurality of analog-to-digital converters configured to convert the in-phase and the quadrature component of the electrical signal into a digital signal comprising a plurality of signal samples at succeeding time instances; wherein the plurality of signal samples is associated with a carrier phase.

The optical receiver may comprise a carrier phase estimation unit configured to provide a plurality of estimates of the carrier phase at the succeeding time instances. The carrier phase estimation unit may comprise any of the aspects outlined in the present document. The optical receiver may further comprise a carrier phase compensation unit configured to modify the plurality of signal samples based on the plurality of estimates of the carrier phase. In particular, the carrier phase compensation unit may offset, e.g. by addition or subtraction, the plurality of signal phases by the plurality of estimates of the carrier phase, respectively.

It should be noted that the above mentioned aspects may be combined with one another or extracted from one another in various ways. In particular, all possible claim and feature combinations are considered to be disclosed by the present document. Furthermore, the aspects and features outlined in relation with a system are equally applicable in relation to the corresponding method.

BRIEF DESCRIPTION OF DRAWINGS

The objects and features of the invention will become apparent from the following description of examples. The present invention is described in the following by referring to exemplary embodiments illustrated schematically in the accompanying figures, wherein.

DETAILED DESCRIPTION

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

At an optical transmitter an optical carrier of a certain wavelength is modulated with a certain modulation scheme, in order to transmit data to a corresponding optical receiver. Different modulation schemes may be used for this purpose, such as B-PSK (binary phase-shift keying) which maps one bit of data into a symbol, Q-PSK (quadrature phase-shift keying) which maps 2 bits of data into a symbol, M-PSK which maps $\log_2(M)$ bits of data into a symbol. Furthermore, x-QAM (quadrature amplitude modulation) schemes may be used, wherein x represents the number of constellation points on the QAM grid. Typical forms of QAM are 16-QAM, 64-QAM, 128-QAM and 256-QAM. The QAM schemes also rely on carrier phase estimation in which the NL phase statistics can be extracted. Consequently, the NL phase statistics determination schemes outlined in the present document may be used.

Figure 1:
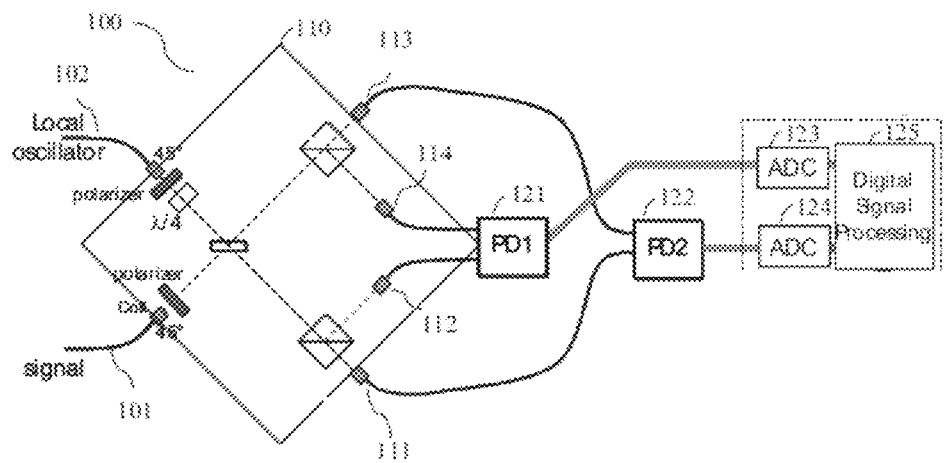
FIG. 1 illustrates an exemplary coherent optical receiver.

In the following, M-PSK modulation is assumed. The transmitted symbol $x_T[n]$ at the time slot n may be written as:

$$x_T[n] = a_T[n] e^{j(\phi_d[n] + \phi_c)},$$

where $a_T[n]$ is the amplitude which for M-PSK modulation is a constant $a_T$, $\phi_d[n]$ is the phase of the transmitted data symbol m, with $$\phi_d[n] = \frac{2\pi}{M} m$$

and $m = 0, \ldots, M-1$, and $\phi_c$ is the phase of the optical carrier. Subsequent to modulation, the modulated optical carrier signal is transmitted over an optical transmission network or optical transmission channel to a corresponding receiver. Typically, the optical receiver is a coherent optical receiver comprising a coherent mixer 110 for coherent detection of PSK modulated signals. An exemplary coherent receiver 100 is shown schematically in FIG. 1. A received signal 101 at a certain optical carrier frequency and an optical signal 102 of the local oscillator (LO) at a certain local oscillator frequency are combined in the coherent mixer 110, which generates four optical interference signals for four output ports 111, 112, 113, 114. The mixer 110 is typically designed such that, from one port to the next, the relative phase between the received optical signal 101 and the LO signal 102 is rotated by 90°. Ports 111 & 113 and 112 & 114 are fed to two sets of balanced photodiodes 121, 122. The coherent mixer 110 is used to generate optical signals that will create in-phase I and quadrature Q components after beating on the photodiodes. In other words, the combination of the coherent mixer 110 and the photodiodes generate I and Q components. It is to be denoted that the present invention can be applied to other types of coherent receivers and other modulation formats involving phase modulation as well. In particular, the invention is applicable to any kind of I and Q component generation schemes.

The analog electrical in-phase and quadrature component of the optical signal are sampled with analog-to-digital converters (ADCs) 123, 124. The sampled digital signals are then processed in the digital domain by a digital signal processor 125 to pre-process the digital signals and to eventually demodulate the transmitted data.

Figure 2:
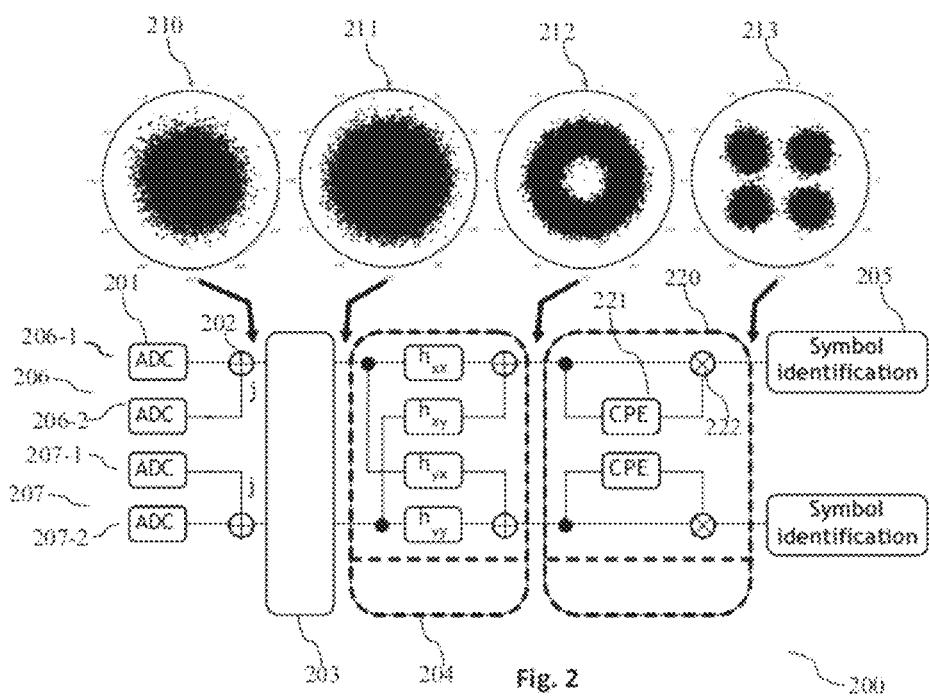
FIG. 2 illustrates exemplary signal processing in an optical receiver.

The processing steps that may be performed on the digital received signals are outlined in further detail in FIG. 2. FIG. 2 illustrates an exemplary scenario of an optical receiver 200 for polarization multiplexed optical signals, i.e. optical signals comprising two orthogonally polarized optical signal components 206, 207. Each polarized optical signal component comprises an in-phase 206-1, 207-1 and a quadrature 206-2, 207-2 signal component as outlined above. For ease of illustration, only one of the polarized optical signal components 206 is considered in the following.

As mentioned above, the analog received signals are converted into digital signals using ADCs 201, thereby yielding digital received signals comprising an in-phase and a quadrature component. The samples of the two digital signal components in a time slot n may be converted from cartesian coordinates into polar coordinates in a conversion unit 202. As such, samples or symbols of the received signal in a time slot n may be obtained which can be described by an amplitude $a_R[n]$ and by a phase $\phi_R[n]$. The samples or symbols of the received signal for a plurality of time slots are plotted in the diagram 210.

As part of the digital signal processing, compensation of linear-distortion effects, e.g. chromatic dispersion (CD) and/or polarization mode distortion (PMD), may be performed. This may be performed in the CD equalization unit 203. The outcome of the equalized symbols is illustrated in diagram 211.

If orthogonally polarized optical signals are received, then the optical receiver 200 may comprise a polarization de-multiplexer 204 which aims at de-multiplexing the two orthogonally multiplexed signal components or polarization tributaries using an adaptive equalizer. The equalizer may use e.g. a constant modulo algorithm (CMA) or decision directed algorithms. As an outcome, de-multiplexed symbols are obtained as illustrated in diagram 212. The optical receiver 200 also comprises a carrier phase recovery and compensation unit 220. The input to the carrier phase recovery and compensation unit 220 are possibly pre-processed symbols which comprise an amplitude a[n] and a phase $\hat{\phi}[n]$. As outlined above, the phase of the symbols at the transmitter comprises the phase $\phi_c[n]$ of the optical carrier. This carrier phase $\phi_c[n]$ is submitted to various distortion effects within the optical transmission channel. Consequently, at the optical receiver 200, this carrier phase $\phi_c[n]$ is unknown and continuously changing. As such, the carrier phase recovery and compensation unit 220 comprises a carrier phase estimation unit 221 which continuously estimates the carrier phase. The estimated carrier phase may be used to synchronize the phase of the local oscillator (LO) accordingly and to thereby compensate the carrier phase fluctuations directly at the coherent optical receiver 100 in the optical domain. Alternatively or in addition, the carrier phase fluctuations may be compensated in the digital domain in the compensation unit 222. As an outcome symbols with a compensated carrier phase are obtained as illustrated in diagram 213.

It can be seen that the received and digitally processed symbols shown in diagram 213 are grouped into four clusters corresponding to the constellation points of a Q-PSK modulation. In other words, the constellation of the symbol states has been fixed as an outcome of the compensation of the carrier phase fluctuations.

Figure 5:
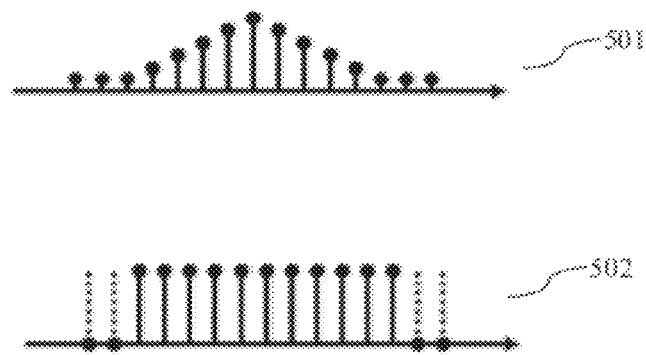
FIG. 5 shows exemplary filter types for the carrier phase estimator.

Eventually, the digitally processed symbols are submitted to the symbol identification unit 205 which performs the mapping of the digitally processed symbols to the constellation points of the underlying modulation scheme. It can be shown that non-linear effects in optical fiber communications impact the carrier phase of coherent systems using phase shift keying (PSK) modulation formats. As such, the carrier phase estimator (CPE) 221 should take into account such non-linear distortion effects. A possible measure for the mitigation of non-linear impairments is to vary the length of the filter used in a carrier phase estimator 221. In an embodiment, an equal tap-weights filter is used for the carrier phase estimation and the length of the equal tap-weights filter, i.e. the number of taps of the filter is changed. The aspect of is changing the length of equal tap-weights filters may be referred to as the Viterbi & Viterbi algorithm. Such an equal tap-weights filter 502 is shown in FIG. 5. The equal tap-weights may e.g. take on the values 0 and 1. For sake of illustration, FIG. 5 also shows a filter 501 with adjustable tap-weights.

A technical problem when estimating the carrier phase using equal tap-weights filters with modifiable lengths is to specify a monitoring method which allows for an adaptive adjustment of the length of the filter used in the carrier phase estimator 221 depending on the non-linear impairments experienced by the optical signal in the optical transmission channel. This is particularly relevant in the context of non-linear impairments which lead to fast distortions of the carrier phase. A proposed solution to this technical problem is to monitor the correlation length of the carrier phase. The correlation length of the carrier phase can be obtained in low speed DSP (digital signal processing) and requires low computational efforts. The reason for the fact that the carrier phase statistics can be assessed in low speed digital signal processing is that the statistics of the degradations arising from the non-linear effects experienced by the transmitted signal can be considered as constant as long as no reconfiguration occurs in the optical transmission network. Possible reconfigurations of the optical network may be due to changing power in the different optical transmission channels and/or switching of optical transmission channels.

Figure 3:
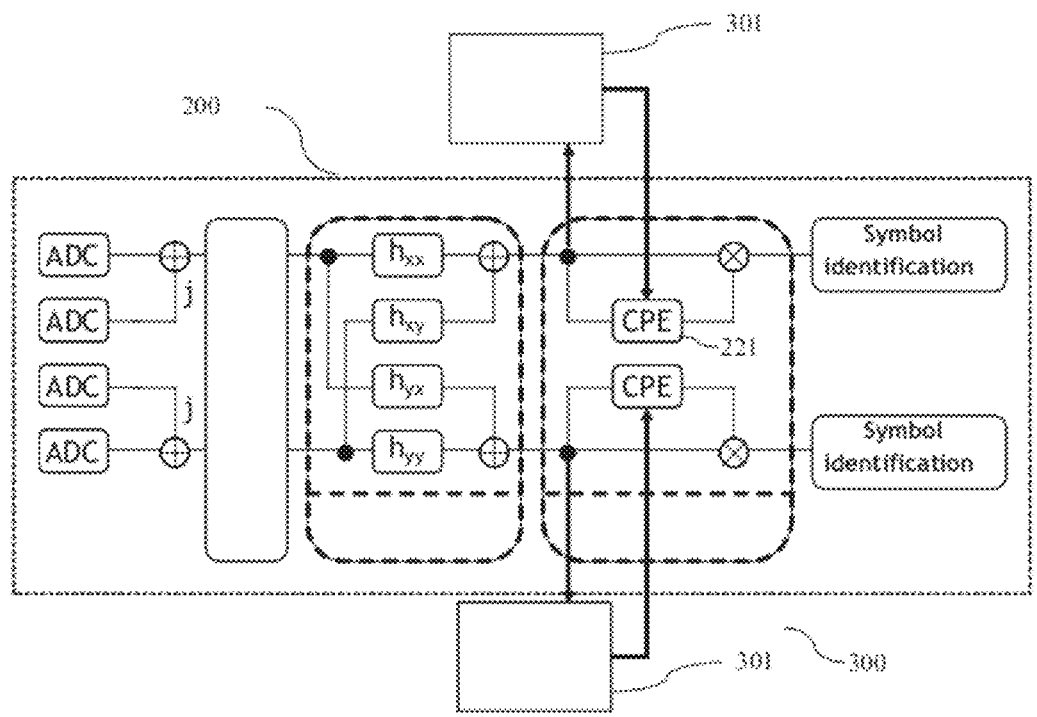
FIG. 3 illustrates an exemplary optical receiver comprising a carrier phase statistics determination unit.

An exemplary structure of the proposed optical receiver 300 comprising a carrier phase estimator 221 is illustrated in FIG. 3. FIG. 3 shows an optical receiver 200 with an additional carrier phase statistics determination unit 301. While the processing in the optical receiver 200 involves high speed processing at the data rates, e.g. 100 Gbit/s, the processing in the carrier phase statistics determination unit 301 may be performed at a reduced speed. By way of example, the carrier phase statistics may be determined for an initial block of signal samples and may then be used for a predetermined time period. This is due to the fact that even though the received carrier phase fluctuates continuously, the statistics of the carrier phase, i.e. the statistics of the non-linear effects causing the carrier phase fluctuations, may be considered to be constant within a stable network environment.

Figure 4:
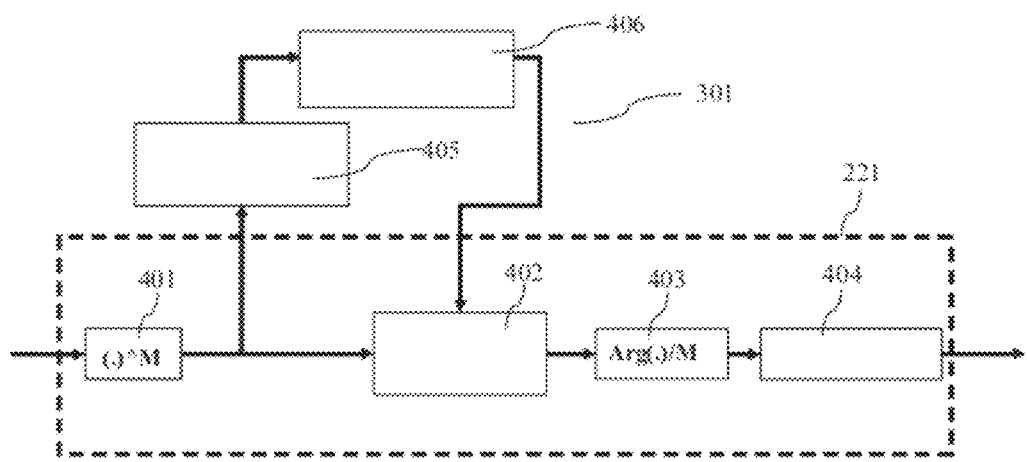
FIG. 4 shows an exemplary carrier phase estimator.

FIG. 4 illustrates a detail of FIG. 3 comprising the carrier phase estimation unit 221 and the carrier phase statistics determination unit 301. The carrier phase estimation unit 221 comprises a data phase cancellation unit 401 which cancels the signal phase by raising the received signal to the Mth power, i.e. to a power corresponding to the underlying M-PSK modulation scheme.

Furthermore, the carrier phase estimation unit 221 comprises a filtering unit 402 which provides an estimate of the carrier phase based on the received symbols. In an embodiment, the filtering unit 402 comprises a variable length equal-weights tap filter 502. In addition, the carrier phase estimation unit 221 comprises a dividing unit 403 which divides the determined carrier phase estimate by the value M corresponding to the underlying M-PSK modulation scheme. This "divide"-operation is a consequence of the "raising to the power of M"-operation which results in a multiplication by a factor M of the signal phase. Consequently, the estimated phase should be divided by the factor M, in order to yield the estimate of the carrier phase. In a similar manner, the divide operation should compensate the "raising to the power" operation performed in the context of x-QAM. Eventually, the carrier phase estimation unit 221 comprises an unwrapping unit 404 which unwraps the carrier phase estimate, i.e. which reconstructs the continuity of the phase signal.

The carrier phase statistics determination unit 301 comprises an autocorrelation determination unit 405 which is configured to determine autocorrelation statistics based on samples of the signal phase $\hat{\phi}[n]$. In addition, the carrier phase statistics determination unit 301 may comprise a correlation length estimation unit or a correlation length estimator 406, which is configured to determine a length of the correlation of the non-linear effect induced phase noise. This length value may be the basis for the determination of the length of the filter comprised within the filtering unit 402.

In the following, parameters which may be determined in the carrier phase statistics unit 301 are derived. At the input of CPE stage 221, the received M-PSK modulated signal at the $n^{th}$ time slot can be expressed as follows:

$$x[n]=a[n]e^{j\phi[n]}=a[n]e^{j(\phi_d[n]+\phi_c[n]+\phi_n[n])},$$

where x[n] is a sample of the received signal at the time slot n, $\phi_d[n]$ represents the phase of the transmitted data symbol, $\phi_c[n]$ represents the carrier phase which is to be recovered and $\phi_n[n]$ represents Amplified Spontaneous Emission (ASE) noise-induced phase fluctuations. The ASE noise-induced phase fluctuations $\phi_n[n]$ may typically be modelled by additive white Gaussian noise. The term a[n] represents the amplitude of the symbol of the received signal.

The aim of the CPE process is to estimate the carrier phase $\phi_c[n]$ as accurately as possible in order to cancel it from the input signal and to thereby isolate the phase of the transmitted data symbol $\phi_d[n]$. The carrier phase term $\phi_c[n]$ can typically be decomposed as follows:

$$\phi_c[n]=\phi_{NL}[n]+\phi_{LW}[n],$$

where $\phi_{NL}[n]$ represents the non-linear (NL) effect induced phase noise, i.e. the phase noise induced by non-linear effects such as SPM and/or XPM. $\phi_{LW}[n]$ represents the phase noise of the laser used as the local oscillator.

In the absence of NL induced phase noise, e.g. if non-linear optical effects can be neglected, the carrier phase term is reduced to laser phase noise fluctuations. Since laser phase noise varies with the order of some MHz (in contrary to the data rates of 100 Gb/s), these phase fluctuations may typically be considered as constant over a large range of consecutive samples. In such cases, the carrier phase may be estimated using large equal tap-weight filters. In other words, if non-linear induced phase noise can be neglected, an increase of the filter length typically increases the performance of the carrier phase estimator.

However, when NL induced phase noise becomes dominant, e.g. when increasing the optical input power into the optical fiber, carrier phase fluctuations are much faster and are not correlated over a large range of samples anymore. In such cases, an increase of the length of the filter used for the estimation of the carrier phase does not increase the quality of the determined carrier phase estimate. As a matter of fact, it can be shown that an increase of the filter length actually decreases the quality of the carrier phase estimate.

It is therefore proposed to select the length of the filter used for carrier phase estimation based on the degree of non-linear distortions incurred by an optical signal in an optical transmission channel. For this purpose, a measure or criterion for the degree of non-linear distortion of an optical transmission channel is derived in the following. Such criterion may be the correlation length of the NL induced phase noise.

The autocorrelation function $R_{NL}[k]=E[\phi_{NL}[n]\phi_{NL}[n+k]]$ of the NL induced phase noise $\phi_{NL}[n]$, with k being the autocorrelation lag, can be determined from the autocorrelation function of the phase $\bar{\phi}[n]$ of the received signal. As outlined above, the phase samples $\bar{\phi}[n]$ of the received signal may be processed in the data phase cancellation unit 401 using a "raising to the power of M"-operation, thereby yielding phase samples $\phi[n]$ which do not comprise the phase of the data symbols anymore. The phase samples $\phi[n]$ at the outputs of the data phase cancelation unit 401 are therefore given by $\phi[n]=\phi_c[n]+\phi_n[n]$.

Typically, it can be assumed that the NL induced phase noise $\phi_{NL}[n]$, the laser phase noise $\phi_{LW}[n]$ and the ASE noise $\phi_n[n]$ are independent. As a consequence, the autocorrelation function of the phase samples $\phi[n]$ at the output of the data phase cancelation unit 401 R[k] can be written as $$\begin{aligned}R[k]&=E[\phi[n]\phi[n+k]]-E^2[\phi[n]]\\&=E[\phi_{NL}[n]\phi_{NL}[n+k]]-E^2[\phi_{NL}[n]]+E[\phi_{LW}[n]\phi_{LW}[n+k]]-\\&\quad E^2[\phi_{LW}[n]]+E[\phi_n[n]\phi_n[n+k]]-E^2[\phi_n[n]]\\&=R_{NL}[k]+R_{LW}[k]+R_n[k]\end{aligned}$$

where $R_{NL}[k]$ is the autocorrelation of the NL induced phase noise, $R_{LW}[k]$ is the autocorrelation of the laser phase noise and $R_n[k]$ is the autocorrelation of the ASE phase noise.

In view of the fact that ASE phase noise is typically considered to be stationary white noise with $E[\phi[n]]=0$, its autocorrelation function $R_n[k]$ for $k\neq 0$ is zero. Furthermore, if the ASE phase noise is considered to be Gaussian noise, the autocorrelation function for k=0 corresponds to the variance of the ASE noise, i.e. $R_n[0]=Var(\phi_n)$.

Consequently, the autocorrelation function of the NL induced phase noise can be written as:

$$R_{NL}[k]=R[k]-R_{LW}[k]-Var(\phi_n),k=0$$

$$R_{NL}[k]=R[k]-R_{LW}[k],k\neq 0$$

As mentioned above, one can typically make the assumption that the laser phase noise $\phi_{LW}[n]$ varies in the range of MHz. It may therefore be assumed that for relatively large delay ranges, i.e. relatively large range of lag values k, the laser phase noise $\phi_{LW}[n]$ is constant. At the same time, it may be assumed that the autocorrelation of the NL induced phase noise $\phi_{NL}[n]$ for large lag values k, i.e. for large delays, tends towards zero. Consequently, it may be assumed that for a large lag values $\hat{k}$, $R[\hat{k}]\approx R_{LW}[\hat{k}]$, i.e. for large lag values the autocorrelation of the laser phase noise is given by the autocorrelation of the measured phase. Furthermore, the large lag value $\hat{k}$ may be selected to be significantly larger than a width of the autocorrelation function of the NL induced phase noise. In particular, the large lag value $\hat{k}$ may be selected to be significantly larger than the correlation length $L_c$ described below, i.e. $\hat{k}>>L_c$.

As it may be difficult to determine the variance of the ASE phase noise $Var(\phi_n)$, the above autocorrelation function for the NL induced phase noise $R_{NL}[k]$ may be determined for lag values k unequal to zero. Based on the values for $R_{NL}[k]$ obtained for $k\neq 0$, a value for the autocorrelation of the NL induced phase noise at k=0 may be interpolated. In particular, the autocorrelation $R_{NL}[0]$ may be determined from the autocorrelation $R_{NL}[k]$ at the lag values $k=-k_0$ and $k=+k_0$.

Consequently, the autocorrelation function of the NL induced phase noise $\phi_{LW}[n]$ may be determined from the autocorrelation function of the measured phase values $\phi[n]$ at the output of the data phase cancellation unit 401 using the following equations:

$$R_{NL}[k] = \begin{cases} R[k] - R[\hat{k}], k \neq 0 \\ \text{Interpolation}(R_{NL}[k], k \neq 0), k = 0, \end{cases}$$

wherein the autocorrelation function of the measured phase values φ[n] may be determined from a block of N samples of the measured phase values φ[n] as:

$$R[k] = \frac{1}{N-k} \sum_{n=1}^{N-k} \phi[n]\phi[n-k],$$

i.e. the autocorrelation function of the phase with lag k may be determined as the mean value across a block of samples of the phase value at a time slot n multiplied by the phase value at a time slot n+k. It should be noted that the autocorrelation function is symmetrical such that typically only the autocorrelation values for positive k need to be determined, as R[k]=R[−k].

Figure 6:
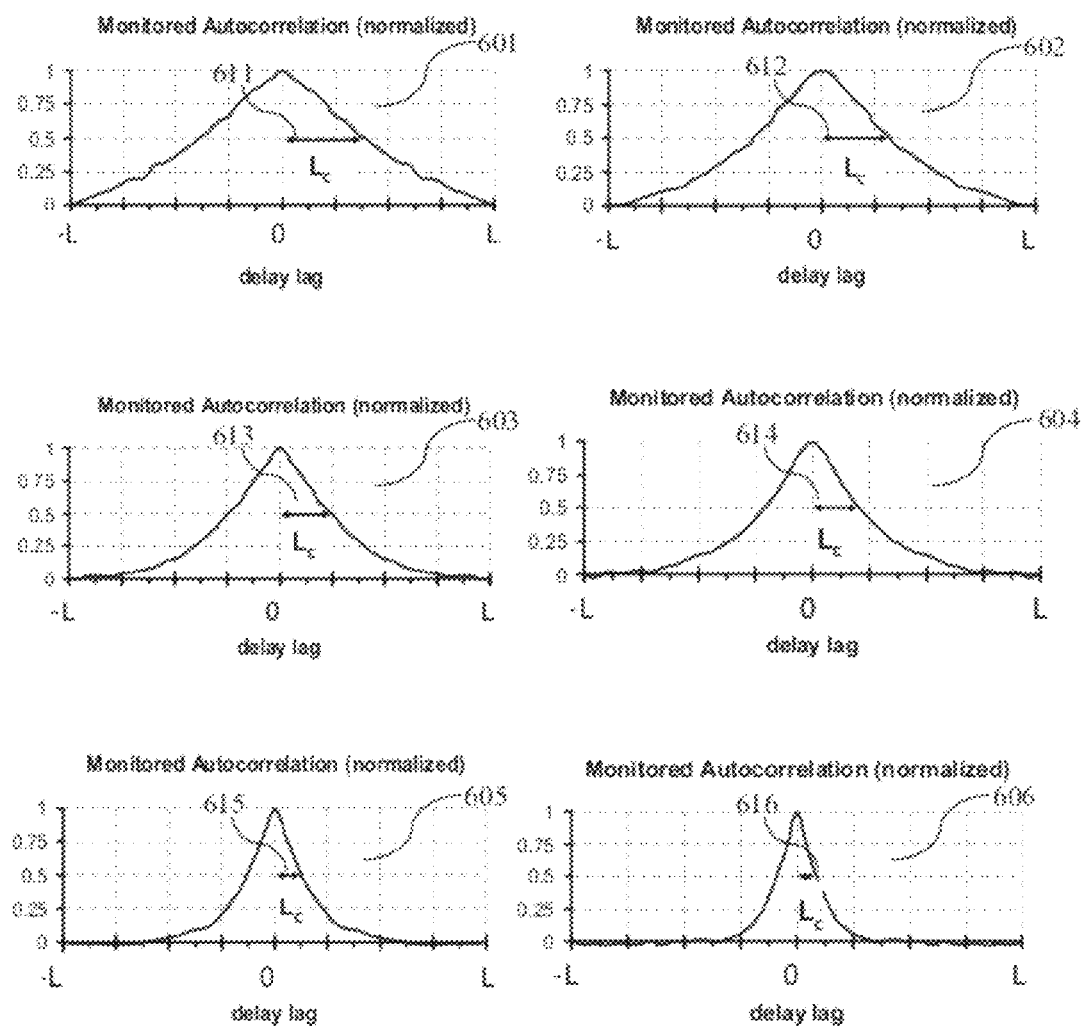
FIG. 6 illustrates exemplary autocorrelation functions of the NL (non-linear) phase noise.

As such, the autocorrelation function of the NL induced phase noise may be determined from the samples of the measured phase φ[n] at the output of the data phase cancellation unit 401. FIG. 6 illustrates several autocorrelation functions of the NL induced phase noise 601, 602, 603, 604, 605, 606 for increasing levels of optical input power used in an optical transmission channel. The autocorrelation is computed for lag values k ranging from −20 to +20. A block of approx. 50.000 phase samples were considered for the determination of the autocorrelation function in order to obtain a suitable resolution. This number of phase samples is compliant with the target of slow DSP for the determination of the carrier phase statistics. It should be noted that FIG. 6 illustrates a scaled or normalized version of the autocorrelation function, e.g.

$$\frac{R_{NL}[k]}{R_{NL}[0]}.$$

Non-linear distortion effects typically increase with increasing optical input power. It can be seen from FIG. 6 that the autocorrelation function of the NL induced phase noise $R_{NL}[k]$ changes its shape with increasing optical input power. Consequently, the shape of the autocorrelation function of the NL induced phase noise $R_{NL}[k]$ is a good indicator or measure for the amount of non-linear distortion incurred in an optical transmission channel. In particular, it can be seen that the width of the autocorrelation function $R_{NL}[k]$ is a good measure for non-linear distortion effects.

FIG. 6 indicates possible width values 611, 612, 613, 614, 615, 616 corresponding to the autocorrelation functions 601, 602, 603, 604, 605, 606. The width values $L_c$ may be defined as the half width of the autocorrelation function of the NL induced phase noise at half of the maximum value of the autocorrelation function. In case of a normalized autocorrelation function, the width value $L_c$ may be defined as the half width of the normalized autocorrelation function of the NL induced phase noise at a value of 0.5 of the normalized autocorrelation function. It can be seen that the width values $L_c$, which may be referred to as the correlation length of the NL induced phase noise, decreases with increasing degree of non-linear distortion. As such, the correlation length $L_c$ may be used as a measure for the non-linear distortion incurred in an optical transmission channel. In other words, the correlation length $L_c$ may be used as a measure for the quality of an optical transmission channel.

In particular, the correlation length $L_c$ may be used to determine the length of the filter used in the filtering unit 402 of the carrier phase estimator 221. In view of the fact that the correlation length $L_c$ applies for positive and negative lag values k, the filter length N of the filter of the carrier phase estimator 221 may be set to twice the length of the correlation length $L_c$, i.e N=2*$L_c$. Typically, the closest integer of the value 2*$L_c$ is selected as the filter is length.

The benefit of the proposed technique for selecting the length of the filter of the carrier phase estimator 221 based on the autocorrelation function of the NL induced phase noise is demonstrated in the following using experimental results obtained with a 100 Gb/s channel modulated with QPSK over two polarization states, i.e. polarization division multiplexing-QPSK (PDM-QPSK). The transmission experiment involving 80 channels was carried out over a distance of 800 km, corresponding to two round-trips within a re-circulating loop. The loop was composed of four spans of non zero dispersion shifted fibers (NZDSF) of 100 km separated by dual stage amplifiers including dispersion compensating fiber spools. The output power of all amplifiers was varied by steps of 1 dB from 12 to 18 dBm in order to vary the channel power of all channels. As already mentioned above, the increasing channel power typically leads to a higher degree of non-linear impairments. Hence, the transmission experiment allowed the assessment of the performance of the proposed technique while varying the magnitude of the non-linear impairments.

Figure 7:
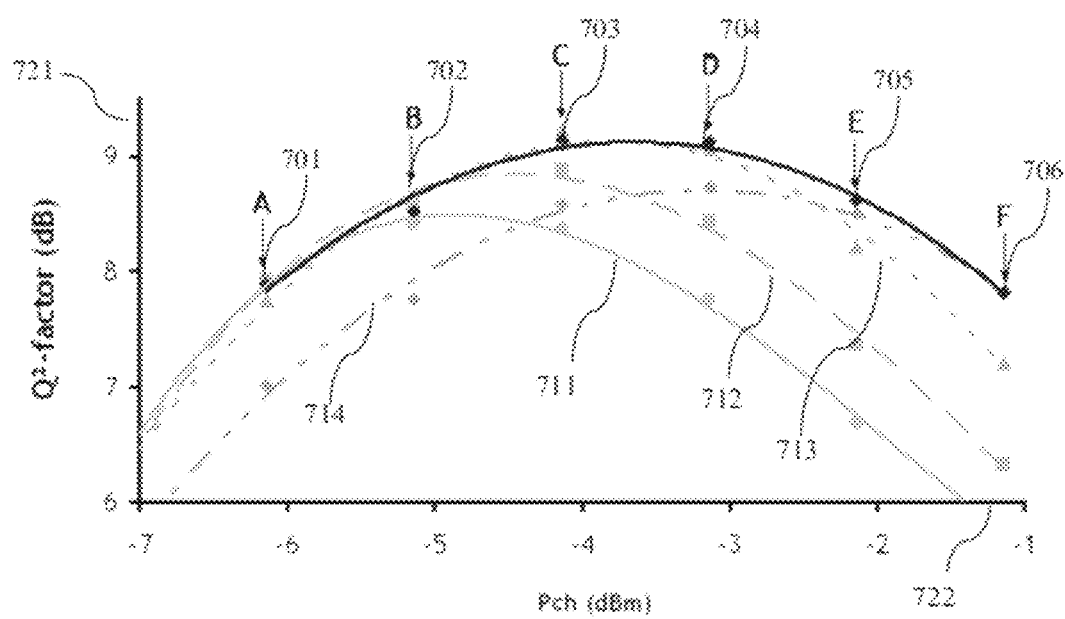
FIG. 7 illustrates exemplary experimental results of the transmission quality using the described method for carrier phase estimation.

The experimental results are illustrated in FIG. 7. The x-axis 722 corresponds to the channel power going from 12 to 18 dBm (i.e. −7 to −1). The y-axis 721 indicates the $Q^2$-factor which is a standard quality measure of a transmission channel and which is inversely related to the bit error rate. As such, the y-axis 721 represents the quality of the optical transmission channel.

In a first experiment, the carrier phase has been estimated using equal tap-weights filters with fixed length. FIG. 7 shows the quality of the transmission channel using a filter of length N=15 (reference sign 711), a filter of length N=11 (reference signal 712), a filter of length N=7 (reference signal 713) and a filter of length N=3 (reference signal 714). The different graphs 711, 712, 713, 714 show that the increase of the channel power, which leads to an increase of fiber non-linearities, requires a progressive reduction of the filter length in order to optimize the performance of the transmission channel. It can be seen that with an increasing degree of fiber non-linearities, the length of the filter should be decreased. I.e. the length of the filter is selected depending on the ratio between linear distortions and non-linear distortions, wherein the filter length is decreased with an increasing fraction of non-linear distortions and wherein the filter length is increased with a decreasing fraction of non-linear distortions.

In a following experiment, the length of the filter used in the carrier phase estimator has been determined using the above described carrier phase statistics determination technique. For different degrees of non-linearity, i.e. different levels of channel power, the correlation length $L_c$ and the corresponding filter length N has been determined. The autocorrelation functions for the different degrees of non-linearity are shown in FIG. 6, i.e. autocorrelation functions 601, 602, 603, 604, 605, 606. For each channel power, the corresponding correlation lengths $L_c$ can also be determined from FIG. 6 as reference signs 611, 612, 613, 614, 615, 616. When using a filter length which is twice the correlation length $L_c$, and which thereby depends on the channel power and the degree of non-linearity of the channel, the quality values 701, 702, 703, 704, 705, 706 of the transmission channel are obtained. This result demonstrates the efficiency of the proposed technique since the performance obtained corresponds to the optimal performance obtained when statically varying the filter length. Consequently, it can be seen that the described correlation monitoring provides a good estimator of the optimized length of the equal tap-weight filter of a carrier phase estimator, thereby allowing an effective and automatic optimization technique to mitigate non-linear impairments for coherent optical transmission systems. It can also be seen that the performance increase, obtained due to the modification of the filter length in accordance to the degree of non-linear impairments, is quite significant (in the order of 2 dB). This underlines the importance of a timely adaptation of the filter length to varying channel conditions.

As already mentioned above, the autocorrelation statistics and in particular the correlation length $L_c$ may serve further purposes than carrier phase recovery optimization. The autocorrelation properties of the received signal can serve as a quantitative measure of the non-linear impairments endured by the optical signal along a given network path. This may be an alternative to measuring the bit error rate of the detected signal in many conceivable applications. This information can be communicated to the control plane of an optical network, e.g. a node controller or a network management apparatus, to serve in a wavelength assignment process. By way of example, the autocorrelation statistics may be used to select the most suitable optical channel among a set of available channels for a new optical connection. This may be particularly useful in switched optical networks such as ASON (automatically switched optical networks).

In the present document, a system and method for determining the degree of non-linear distortion incurred by an optical signal in an optical transmission network have been described. Based on received data, autocorrelation statistics can be determined at low computation complexity. The autocorrelation statistics can be used to select the appropriate length of a filter used for carrier phase estimation. As a result, the quality of a transmission channel can be improved. The autocorrelation statistics may also be used as a quality measure of an optical transmission channel, thereby allowing the appropriate allocation of optical transmission channels in a switched optical network.

It should be noted that the description and drawings merely illustrate the principles of the proposed methods and systems. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for measuring a non-linearity of an optical transmission channel of an optical fiber, the method comprising:
    providing, at a receiver, a plurality of signal samples at succeeding time instances; wherein the plurality of signal samples is associated with a modulation scheme, which allows a number of possible data phase values, and a carrier phase;
    at a corresponding transmitter, the plurality of signal samples has been encoded using the modulation scheme, modulated onto an optical carrier signal having the carrier phase and transmitted over the optical transmission channel;
    the plurality of signal samples comprises a plurality of signal amplitudes and signal phases, respectively;
    the plurality of signal phases comprises a plurality of data phases and a plurality of residual phases, respectively;
    the plurality of residual phases is associated with the carrier phase;
    canceling the plurality of data phases from the plurality of signal phases by taking into account the modulation scheme, thereby yielding the plurality of residual phases; and determining a set of autocorrelation values of the plurality of residual phases for a set of lag values, respectively, thereby yielding a measure for the non-linearity of the optical transmission channel.

2. The method of claim 1, wherein the plurality of residual phases comprises a plurality of non-linear induced phase noise values and a plurality of laser phase noise values, respectively, the method further comprising:
    determining an autocorrelation value of the plurality of residual phases for a first lag value, thereby yielding an autocorrelation value of the laser phase noise; and determining a set of autocorrelation values of the non-linear induced phase noise by subtracting the autocorrelation value of the laser phase noise from the set of autocorrelation values of the plurality of residual phases.

3. The method of claim 2, further comprising:
determining an autocorrelation value of the non-linear induced phase noise at a lag value of zero, by interpolating a plurality of autocorrelation values of the set of autocorrelation values of the non-linear induced phase noise for lag values different from zero.

4. The method of claim 2, further comprising
determining a second lag value for which a value of the set of autocorrelation values of the non-linear induced phase noise is at half of a maximum value of the set of autocorrelation values of the non-linear induced phase noise, wherein the second lag value is a measure for the non-linearity of the optical transmission channel.

5. The method of claim 4, wherein the first lag value is greater than the second lag value.

6. The method of claim 1, wherein
the modulation scheme corresponds to M-PSK and the canceling step comprises raising the plurality of signal phases to the power of M; or
the modulation scheme corresponds to x-QAM and the canceling step comprises raising the plurality of signal phases to a power which is associated with the number of possible data phase values of the modulation scheme.

7. The method of claim 1, wherein the determining the set of autocorrelation values of the plurality of residual phases for the set of the lag values comprises:
multiplying a residual phase of the plurality of residual phases at a first time instance by a residual phase of the plurality of residual phases at a second time instance, wherein the lag value corresponds to a difference between the second time instance and the first time instance.

8. The method of claim 1, further comprising:
determining an autocorrelation value of the plurality of residual phases for a lag value of zero; and
normalizing the set of autocorrelation values of the plurality of residual phases for the set of lag values by the autocorrelation value of the plurality of residual phases for the lag value of zero.

9. A method for determining a plurality of estimates of a carrier phase of a signal transmitted over an optical transmission channel of an optical fiber, the method comprising:
receiving, at a receiver, a plurality of samples of the signal at succeeding time instances; wherein
the plurality of signal samples is associated with a modulation scheme, which allows a number of possible data phase values, and the carrier phase;
at a corresponding transmitter, the plurality of signal samples has been encoded using the modulation scheme, modulated onto an optical carrier signal having the carrier phase and transmitted over the optical transmission channel;
the plurality of signal samples comprises a plurality of signal amplitudes and signal phases, respectively;
the plurality of signal phases comprises a plurality of data phases and a plurality of residual phases, respectively;
the plurality of residual phases is associated with the carrier phase;
canceling the plurality of data phases from the plurality of signal phases by taking into account the modulation scheme, thereby yielding the plurality of residual phases;

determining a second lag value; and
filtering the plurality of residual phases with a filter comprising a number of filter taps corresponding to two times the second lag value, thereby yielding a plurality of filtered residual phases, associated with the plurality of estimates of the carrier phase at the succeeding time instances.

10. The method of claim 9, wherein weights of the filter taps are equal.

11. The method of claim 9, wherein a filtered residual phase value of a first time instance is determined from residual phase values from the plurality of residual phases at time instances before and after the first time instance.

12. The method of claim 9, further comprising:
dividing the plurality of filtered residual phases by a factor associated with the modulation scheme; and
unwrapping the plurality of divided filtered residual phases, thereby yielding the plurality of estimates of the carrier phase at the succeeding time instances.

13. A system configured to provide a measure of a non-linearity of an optical transmission channel of an optical fiber, the system comprising:
a reception unit configured to provide a plurality of signal samples at succeeding time instances; wherein the plurality of signal samples is associated with a modulation scheme, which allows a number of possible data phase values, and a carrier phase;
at a corresponding transmitter, the plurality of signal samples has been encoded using the modulation scheme, modulated onto an optical carrier signal having the carrier phase and transmitted over the optical transmission channel;
the plurality of signal samples comprises a plurality of signal 14 amplitudes and signal phases, respectively;
the plurality of signal phases comprises a plurality of data phases and a plurality of residual phases, respectively;
the plurality of residual phases is associated with the carrier phase;
a data phase cancellation unit configured to cancel the plurality of data phases from the plurality of signal phases by taking into account the modulation scheme, thereby yielding the plurality of residual phases; and a carrier phase statistics determination unit configured to determine a set of autocorrelation values of the plurality of residual phases for a set of lag values,
respectively, thereby yielding the measure for the non-linearity of the optical transmission channel.

14. A carrier phase estimation unit configured to provide a plurality of estimates of a carrier phase at succeeding time instances, the unit comprising:
a reception unit configured to provide a plurality of signal samples at the succeeding time instances; wherein
the plurality of signal samples is associated with a modulation scheme, which allows a number of possible data phase values, and the carrier phase;
the plurality of signal samples has been encoded using the modulation scheme, modulated onto an optical carrier signal having the carrier phase and transmitted over an optical transmission channel;
the plurality of signal samples comprises a plurality of signal amplitudes and signal phases, respectively;
the plurality of signal phases comprises a plurality of data phases and a plurality of residual phases, respectively;
the plurality of residual phases is associated with the carrier phase;

a data phase cancellation unit configured to cancel the plurality of data phases from the plurality of signal phases by taking into account the modulation scheme, thereby yielding the plurality of residual phases;

a carrier phase statistics determination unit configured to determine a second lag value; and a filtering unit configured to filter the plurality of residual phases with a filter comprising a number of filter taps corresponding to two times the second lag value, thereby yielding a plurality of filtered residual phases, associated with the plurality of estimates of the carrier phase at the succeeding time instances.

\* \* \* \* \*